United States Patent

Kost et al.

Patent Number: 5,613,743
Date of Patent: Mar. 25, 1997

[54] METHOD FOR SETTING TARGET BRAKING TORQUES

[75] Inventors: Friedrich Kost, Kornwestheim; Uwe Hartmann; Karl-Josef Weiss, both of Stuttgart; Thomas Ehret, Seelbach, all of Germany

[73] Assignee: Robert Bosch GmbH, Stuttgart, Germany

[21] Appl. No.: 387,786

[22] PCT Filed: Aug. 24, 1993

[86] PCT No.: PCT/DE93/00770

§ 371 Date: Apr. 6, 1995

§ 102(e) Date: Apr. 6, 1995

[87] PCT Pub. No.: WO94/05534

PCT Pub. Date: Mar. 17, 1994

[30] Foreign Application Priority Data

Sep. 9, 1992 [DE] Germany ............... 42 30 101.7

[51] Int. Cl.$^6$ .................................................. B60T 8/00
[52] U.S. Cl. ............................................ 303/165; 303/141
[58] Field of Search ........................... 303/163, 165, 303/141; 180/197; 364/426.02

[56] References Cited

U.S. PATENT DOCUMENTS

| | | | |
|---|---|---|---|
| 4,491,919 | 1/1985 | Leiber | 364/426 |
| 4,765,430 | 8/1988 | Schulze et al. | 180/197 |
| 4,881,241 | 11/1989 | Pommier et al. | 375/38 |
| 4,903,125 | 2/1990 | Parker | 358/141 |
| 4,970,650 | 11/1990 | Hashiguchi et al. | 180/197 X |
| 4,985,838 | 1/1991 | Hashiguchi et al. | 180/197 X |
| 5,445,442 | 8/1995 | Barth et al. | 303/141 |

FOREIGN PATENT DOCUMENTS

| | | |
|---|---|---|
| 2027571 | 8/1990 | Canada . |
| 4030724 | 4/1992 | Germany . |
| 9205986 | 9/1992 | WIPO . |

*Primary Examiner*—Josie Ballato
*Attorney, Agent, or Firm*—Felfe & Lynch

[57] ABSTRACT

In a vehicular control system in which target braking torques are set for each of the driven wheels, the smaller target braking torque for the driven wheels is determined. Based on this smaller target braking torque, a target engine torque is calculated, and the engine torque is varied to conform to the target engine torque. Residual braking torques are calculated as differences from the target braking torques for each driven wheel and the target engine torque. These residual braking torques are realized by varying the brake pressure. Therefore the target braking torque is split into an engine torque which is equal for both driven wheels and into a braking torque which may be different for each driven wheel.

4 Claims, 2 Drawing Sheets

METHOD FOR SETTING TARGET BRAKING TORQUES

PRIOR ART

DE-A1 40 30 724 discloses a control system in which target slip values for the wheels of a vehicle are determined. The target slip values can consist of slip components which are determined by an ABS and by a vehicle dynamics control. Target braking torques and thus target braking pressures for the wheels are then determined from the target slip values and the actual slip values. The said target braking torques and target braking pressures can then be converted into valve actuation times.

SUMMARY OF THE INVENTION

In the invention, the target braking torques calculated by the ABS and the travel dynamic controller are distributed at the wheels between a target engine torque, which is common to the drive wheels, and individual residual torques. Therefore, the overrun torque is controlled. If braking does not take place (admission pressure $P_{adm}=0$) "select low" control takes place automatically. When there is a large admission pressure $P_{adm}>a$, the engine torque disappears, which in turn has favourable effects on the slip control. The result in the invention is that the engine assumes the low frequency, slow control of the wheels while the fast control takes place via the brake.

The output variable of the subordinate brake slip controller in the vehicle dynamics controller is the target braking torque applied to the respective wheel. In the case of the nondriven wheels this torque can only be set independently for each wheel via the brake callipers.

In the case of the driven wheels, the engine overrun torque can, within certain limits, be additionally used as a control variable in the coupled-in state. In this case, the overrun torque cannot be distributed individually to the driven wheels.

This means that a wheel slip control only with the engine within the vehicle dynamics controller is a "select low" control.

If the driver additionally applies the brake hard or an active braking intervention takes place, the wheel slip is controlled via a common component with the engine torque, and the rest is controlled individually with the braking torque.

The distribution of the target torque between engine and brake and its calculation is the subject matter of this invention.

DETAILED DESCRIPTION OF THE PREFERRED EMBODIMENT

The invention is based on the following considerations:

The equations for the distribution of the target braking torque are derived for a vehicle driven at one axle. In principle, the method can also be used for vehicles with all-wheel drive.

Figure 1:
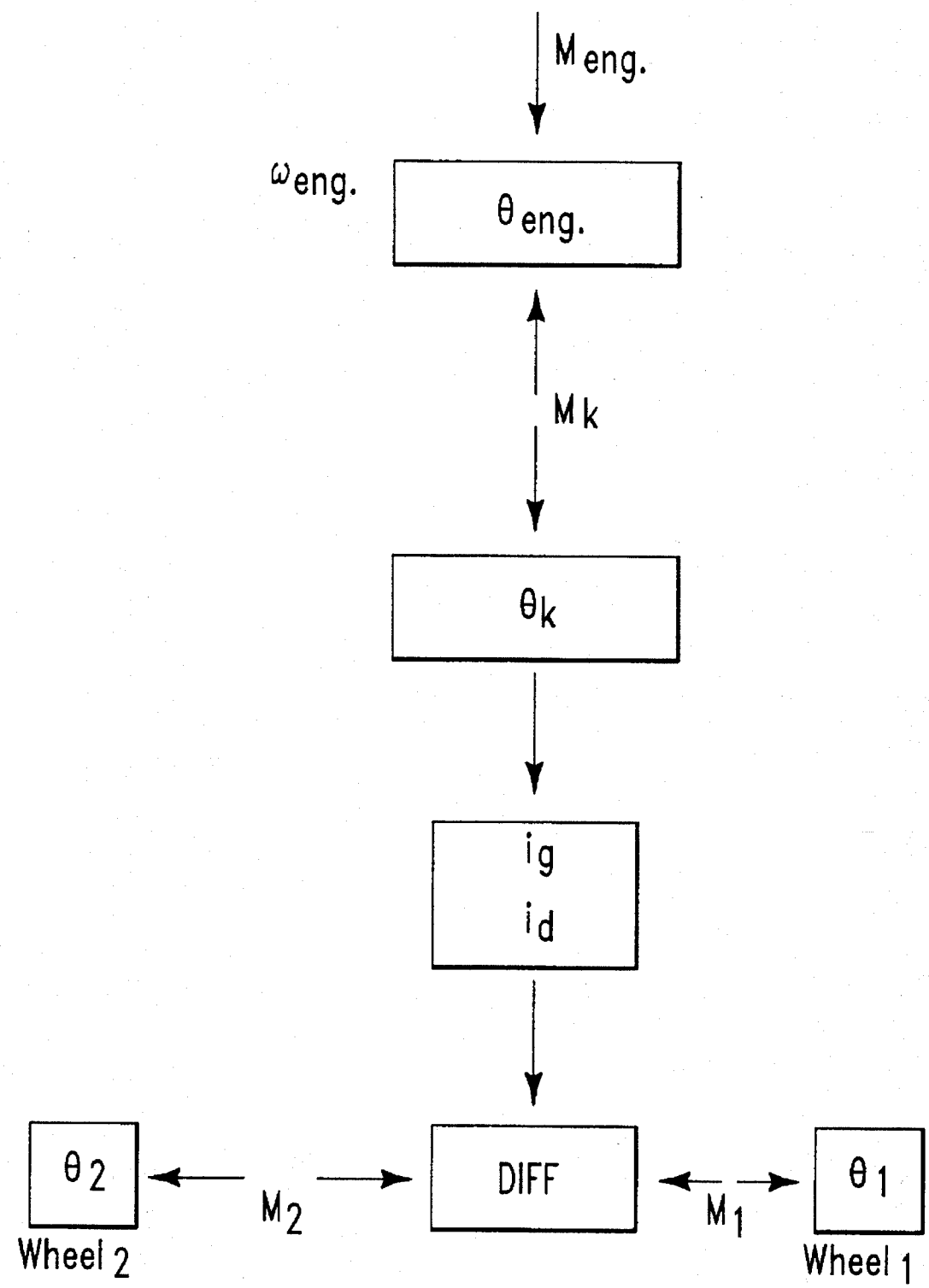
FIG. 1 shows a model of the drive train which is used for the calculation of the target engine torque.

FIG. 1 shows the model of the drive train which is used for the calculation of the target engine torque.

The following equilibrium of torques results from a nonslipping clutch:

$$M_1+M_2=i*(M_{eng}-d/dt(W_{eng})*\Theta_{tot})$$

where:

$$i=i_g*i_d$$

$$\Theta_{tot}=\Theta_{eng}+\Theta_k$$

where:
M1, M2 are driving torques at the wheels
$i_g$ is the gear transmission ratio
$i_d$ is the transmission ratio of the differential
$\Theta_{eng}$ is the moment of inertia of the engine
$\Theta_k$ is the moment of inertia of the clutch
$W_{eng}$ is the rpm.

In addition:

$$M_1=M_2=M_{awheel}$$

$$d/dt(W_{eng})=i*d/dt(v_f)/r=i*bx/r$$

where
$V_f$: vehicle speed
bx: vehicle deceleration
r: radius of the wheel thus the following relation applies to the overrun torque or the driving torque $M_{awheel}$ at the wheel:

$$M_{awheel}=0.5*i*(M_{eng}-i*\Theta_{tot}*bx/r)$$

The wheel slip controller has calculated the target torques $M_{set1}$ and $M_{set2}$ for the driven axle on the basis of target slip deviations.

A target torque to be realized by the engine is calculated from the smaller of the two torques.

$$M_{setmin}=\min(M_{set1}, M_{set2})$$

according to the following formula:

$$M_{engset}=k*M_{setmin}$$

where
$k=(a\ P_{adm})/a$ $0<k\leq 1$
$P_{adm}$: admission pressure of the driver
a: selectable parameter Thus, the engine torque obtained is:

$$M_{eng}=2*M_{engset}/i+i*\Theta_{tot}*bx/r$$

The remaining residual torques are realized via the target pressures $P_{set1}$ and $P_{set2}$ in the wheel brake cylinders.

$$P_{set1}=(M_{set1}-M_{engset})/CP_1$$

$$P_{set2}=(M_{set2}-M_{engset})/CP_2$$

where $CP_{1/2}$=braking torque transmission ratios.

Figure 2:
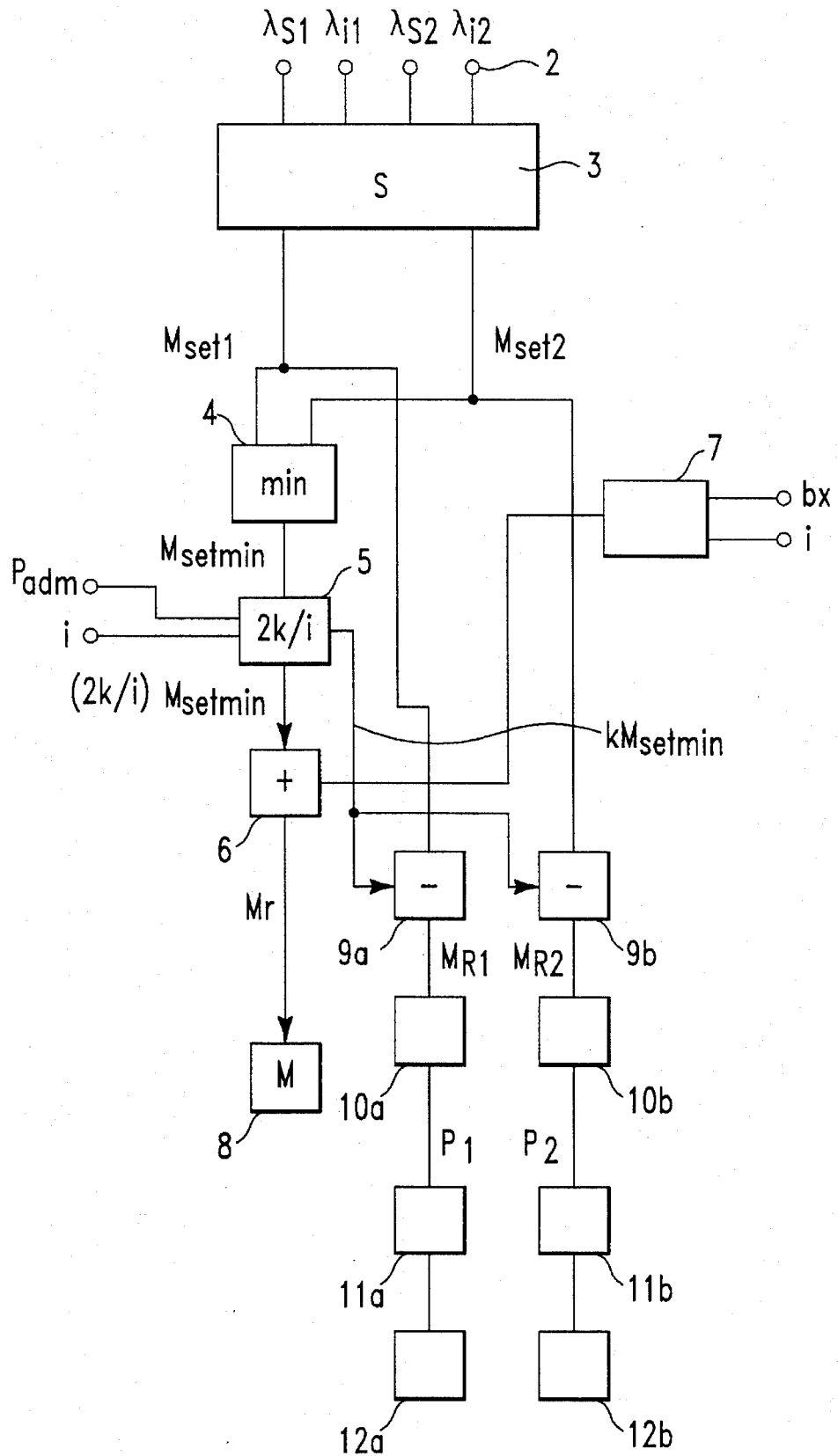
FIG. 2 is a block circuit diagram of an exemplary embodiment of the invention.

In FIG. 2 a block circuit diagram of an exemplary embodiment of the invention is shown. At terminals 2, target brake slip values $\lambda_{s1}$ and $\lambda_{s2}$ and actual brake slip values $\lambda_{i1}$ and $\lambda_{i2}$ of the two driven wheels (1 and 2) which are determined in a known travel dynamic controller and an ABS are fed to a controller 3. The latter determines the target braking torques $M_{set1}$ and $M_{set2}$ of the two wheels. In a block 4, the smaller torque is selected. In a further block 5, the expression $2k/i)M_{setmin}$ is formed, to which the summand $i-bx/r$ acquired in block 7 is added in block 6. The sum influences the engine torque (block 8) and must be realized by the engine by means of the appropriate setting of the throttle valve.

In blocks 9a and 9b the differences $M_{R1}=M_{set1}-kM_{setmin}$ and $M_{R2}=M_{set2}-kM_{setmin}$ are formed and are converted in blocks 10a and 10b into braking pressures $P_1$ and $P_2$. These signals are fed via an inverse hydraulic model 11a and 11b which determine valve operating times, to brake pressure control valves 12a and 12b, by means of which the residual torques are applied to the wheels. Such an inverse hydraulic model is described in DE-A1-40 30 724.

We claim:

1. Method for controlling slippage of driven wheels in a motor vehicle, said method comprising determining target braking torques $M_{set1}$ and $M_{set2}$ for respective driven wheels, determining a smallest torque $M_{setmin}$ of the two torques $M_{set1}$ and $M_{set2}$, calculating a target engine torque $M_{engset}$ from the smallest torque $M_{setmin}$, varying engine torque $M_{eng}$ to conform to $M_{engset}$, calculating residual braking torque $M_{R1}$ based on $M_{set1}$ and $M_{engset}$ and residual braking torque $M_{R2}$ based on $M_{set2}$ and $M_{engset}$, and varying brake pressure at the driven wheels so that the residual torques $M_{R1}$ and $M_{R2}$ are realized.

2. Method as in claim 1 wherein said engine torque is calculated according to $$M_{eng}=2*kM_{setmin}/i+i*\Theta_{tot}*bx/r$$

where i is the combined transmission ratio of gear box and differential, $\Theta_{tot}$ is the moment of inertia of the engine and gearbox, bx is the vehicle deceleration, r is the wheel radius, and k is a variable between 0 and 1 which becomes small with increasing brake pressure $P_{adm}$ applied by the driver.

3. Method as in claim 1 wherein $$M_{R1}=M_{set1}-M_{setmin} \text{ and } M_{R2}=M_{set2}-M_{setmin}.$$

4. Method as in claim 3 wherein brake pressure is varied at the driven wheels by converting $M_{R1}$ and $M_{R2}$ to brake valve operating times.

* * * * *

UNITED STATES PATENT AND TRADEMARK OFFICE
CERTIFICATE OF CORRECTION

PATENT NO. : 5,613,743
DATED : March 25, 1997
INVENTOR(S) : Kost et al.

It is certified that error appears in the above-identified patent and that said Letters Patent is hereby corrected as shown below:

In column 2, line 21, change "$M_{awheel}$" to -- $M_{aWheel}$ --.

In column 2, line 30, change "$M_{awheel}$" to -- $M_{aWheel}$ --.

In column 3, line 1, before "2k/i)" add -- ( --.

In column 3, line 2, change "i–bx/r" to -- i-bx/v --.

Column 3, line 13, of the Patent, after "DE-A1-40 30 724" insert --, incorporated herein by reference--.

Signed and Sealed this

Ninth Day of May, 2000

Attest:

Q. TODD DICKINSON

*Attesting Officer*   *Director of Patents and Trademarks*